US008483441B2

(12) United States Patent
Yu et al.

(10) Patent No.: US 8,483,441 B2
(45) Date of Patent: Jul. 9, 2013

(54) AUTOMATIC RECOGNITION OF SCALE MARKS ON LEVEL RULER

(75) Inventors: Fei-Xing Yu, Hang-Zhou (CN); Xiang-Zhe Kang, Hang-Zhou (CN)

(73) Assignee: Asia Optical International Ltd., Road Town, Tortola (VG)

( * ) Notice: Subject to any disclaimer, the term of this patent is extended or adjusted under 35 U.S.C. 154(b) by 1124 days.

(21) Appl. No.: 12/332,377

(22) Filed: Dec. 11, 2008

(65) Prior Publication Data

US 2010/0034467 A1 Feb. 11, 2010

(30) Foreign Application Priority Data

Aug. 11, 2008 (TW) .................................. 97130512 A

(51) Int. Cl.
*G06K 9/00* (2006.01)
(52) U.S. Cl.
USPC .............................. 382/106; 356/617; 33/293
(58) Field of Classification Search
None
See application file for complete search history.

(56) References Cited

U.S. PATENT DOCUMENTS

| | | | | |
|---|---|---|---|---|
| 4,441,204 A | * | 4/1984 | Hanna ........................... | 382/139 |
| 4,931,881 A | * | 6/1990 | Matsui et al. ................ | 358/466 |
| 5,742,378 A | * | 4/1998 | Kumagai et al. ............ | 356/4.08 |
| 6,167,629 B1 | * | 1/2001 | Chiba ............................ | 33/293 |
| 6,907,133 B2 | * | 6/2005 | Gotoh ......................... | 382/106 |
| 7,644,505 B2 | * | 1/2010 | Zeng et al. ..................... | 33/293 |
| 7,697,160 B1 | * | 4/2010 | Brosius ......................... | 358/1.2 |
| 2004/0140992 A1 | * | 7/2004 | Marquering et al. ......... | 345/700 |

OTHER PUBLICATIONS

Wikipedia (Oct. 2007) "Connected-component labeling." Version as of Oct. 1, 2007, retrieved from article history at http://en.wikipedia.org/wiki/Connected-component_labeling.*
Department of the Army (Jun. 1971) Elements of Surveying.*

* cited by examiner

*Primary Examiner* — Barry Drennan
(74) *Attorney, Agent, or Firm* — McClure, Qualey & Rodack, LLP

(57) ABSTRACT

Image recognition and distance calculation methods and devices are provided. First, an image corresponding to a level ruler is obtained, wherein the image includes a first predefined scale and a second predefined scale projected on the level ruler. Then, a baseline height of a baseline mark in the level ruler is determined according to the image. The heights of the first predefined scale and the second predefined scale are calculated according to the baseline height of the baseline mark, the position of the baseline mark in the image, and the positions of the first predefined scale and the second predefined scale in the image. Thereafter, a distance to the level ruler is calculated according to a height difference between the heights of the first predefined scale and the second predefined scale.

21 Claims, 15 Drawing Sheets

| Adjacent Pixel 1 | Adjacent Pixel 2 | Adjacent Pixel 3 |
|---|---|---|
| Adjacent Pixel 4 | Pixel witout label | |
| | | |

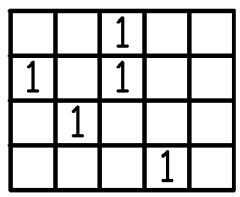
FIG. 13A
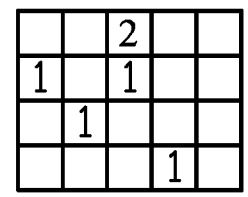
FIG. 13B
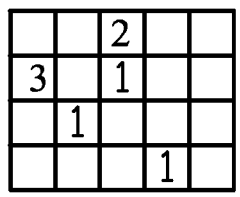
FIG. 13C
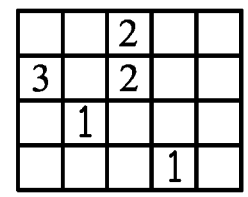
FIG. 13D
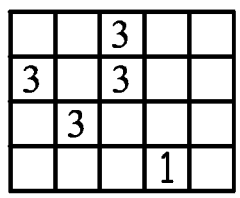
FIG. 13E
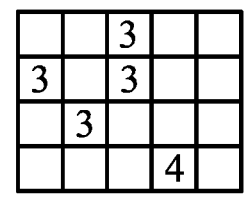
FIG. 13F
5
FIG. 13G
5
FIG. 13H

AUTOMATIC RECOGNITION OF SCALE MARKS ON LEVEL RULER

CROSS REFERENCE TO RELATED APPLICATIONS

This Application claims priority of Taiwan Patent Application No. 097130512, filed on Aug. 11, 2008, the entirety of which is incorporated by reference herein.

BACKGROUND OF THE INVENTION

1. Field of the Invention

The disclosure relates generally to image recognition and distance calculation methods and devices, and, more particularly to methods and devices that automatically determine a height of at least one predefined scale, and determine a distance between a device, such as a digital level and a level ruler.

2. Description of the Related Art

In measurement instruments, levels can be used to measure height difference. A level, can use an optical device at its side, such as a telescope to view a level ruler positioned at the other side. Generally, a crisscross and two predefined scales respectively above and below of the crisscross are marked in the telescope, and an operator must manually view the positions of the crisscross and the predefined scales projected on the level ruler, and accordingly determine the height of the level ruler, and the distance between the level and the level ruler.

Currently, manual readings are required for most levels for related determinations. Since the determinations are performed manually, erroneous determinations frequently occur. To reduce erroneous determinations, some digital levels can provide automatic readings and determinations. However, the position of the level ruler, such as being upright, inverted or tilted, and the brightness of the location where the level ruler is positioned, may affect the determination results. Thus, the determination results of digital levels are often suspect to being inaccurate.

BRIEF SUMMARY OF THE INVENTION

Image recognition and distance calculation methods and devices are provided.

In an embodiment of an image recognition method, an image corresponding to a level ruler is obtained, wherein the image comprises at least one predefined scale projected on the level ruler. Then, a baseline height of a baseline mark in the level ruler is determined according to the image. Positions of a top boundary and a bottom boundary of a scale in the image are sought from a position of the baseline mark in the image as a beginning position, wherein the predefined scale corresponds to the scale on the level ruler. Thereafter, a height of the predefined scale is recognized according to a position of the predefined scale in the image, the positions of the top boundary and the bottom boundary of the scale in the image, the baseline height of the baseline mark, and a scale number between the beginning position and the top boundary of the scale in the image.

In an embodiment of a distance calculation method, an image corresponding to a level ruler is obtained, wherein the image comprises a first predefined scale and a second predefined scale projected on the level ruler. Then, a baseline height of a baseline mark in the level ruler is determined according to the image. Heights of the first predefined scale and the second predefined scale are calculated according to the baseline height of the baseline mark, a position of the baseline mark in the image, and positions of the first predefined scale and the second predefined scale in the image. Thereafter, a distance to the level ruler is calculated according to a height difference between the heights of the first predefined scale and the second predefined scale.

An embodiment of an image recognition device comprises a storage unit and a processing unit. The storage unit comprises an image corresponding to a level ruler, wherein the image comprises at least one predefined scale projected on the level ruler. The processing unit determines a baseline height of a baseline mark in the level ruler according to the image. The processing unit seeks positions of a top boundary and a bottom boundary of a scale in the image from a position of the baseline mark in the image as a beginning position, wherein the predefined scale corresponds to the scale on the level ruler. The processing unit recognizes a height of the predefined scale according to a position of the predefined scale in the image, the positions of the top boundary and the bottom boundary of the scale in the image, the baseline height of the baseline mark, and a scale number between the beginning position and the top boundary of the scale in the image.

An embodiment of an image recognition device comprises a storage unit and a processing unit. The storage unit comprises an image corresponding to a level ruler, wherein the image comprises a first predefined scale and a second predefined scale projected on the level ruler. The processing unit determines a baseline height of a baseline mark in the level ruler according to the image. The processing unit calculates heights of the first predefined scale and the second predefined scale according to the baseline height of the baseline mark, a position of the baseline mark in the image, and positions of the first predefined scale and the second predefined scale in the image. The processing unit calculates a distance to the level ruler according to a height difference between the heights of the first predefined scale and the second predefined scale.

In an embodiment of an image recognition method, an image corresponding to a level ruler is obtained, wherein the image comprises at least one predefined scale projected on the level ruler. A baseline numeric value corresponding to a baseline mark in the level ruler is detected according to the image. Positions of a first boundary and a second boundary of a scale in the image are sought from a position of the baseline mark in the image as a beginning position, wherein the predefined scale corresponds to the scale on the level ruler. Thereafter, a specific numeric value corresponding to the predefined scale is recognized according to a position of the predefined scale in the image, the positions of the first boundary and the second boundary of the scale in the image, the baseline numeric value of the baseline mark, and a scale number between the beginning position and the first boundary.

In another embodiment of an image recognition method, it is determined whether a pixel within a seeking area has at least one adjacent pixel having a same pixel character of the pixel. The pixel character represents that a brightness value of the pixel is less than a threshold value. When the pixel has an adjacent pixel having the same pixel character of the pixel, the pixel and the adjacent pixel are marked with a specific label, and a numeric value is determined according to a distribution of the specific label.

Image recognition and distance calculation methods may take the form of a program code embodied in a tangible media. When the program code is loaded into and executed by a machine, the machine becomes an apparatus for practicing the disclosed method.

In the embodiments, the measurement of objects can be automatically performed, and the measurement results thereof can be quickly and accurately obtained, thus reducing time when compared to manual reading and determinations, and improving efficiency of measurements.

BRIEF DESCRIPTION OF THE DRAWINGS

The invention will become more fully understood by referring to the following detailed description with reference to the accompanying drawings, wherein:

FIG. 12 is a schematic diagram illustrating an embodiment of a mask of the invention;

FIGS. 13A~13H are schematic diagrams illustrating an embodiment of a procedure for pixel labeling of the invention;

DETAILED DESCRIPTION OF THE INVENTION

Image recognition and distance calculation methods and devices are provided.

Figure 1:
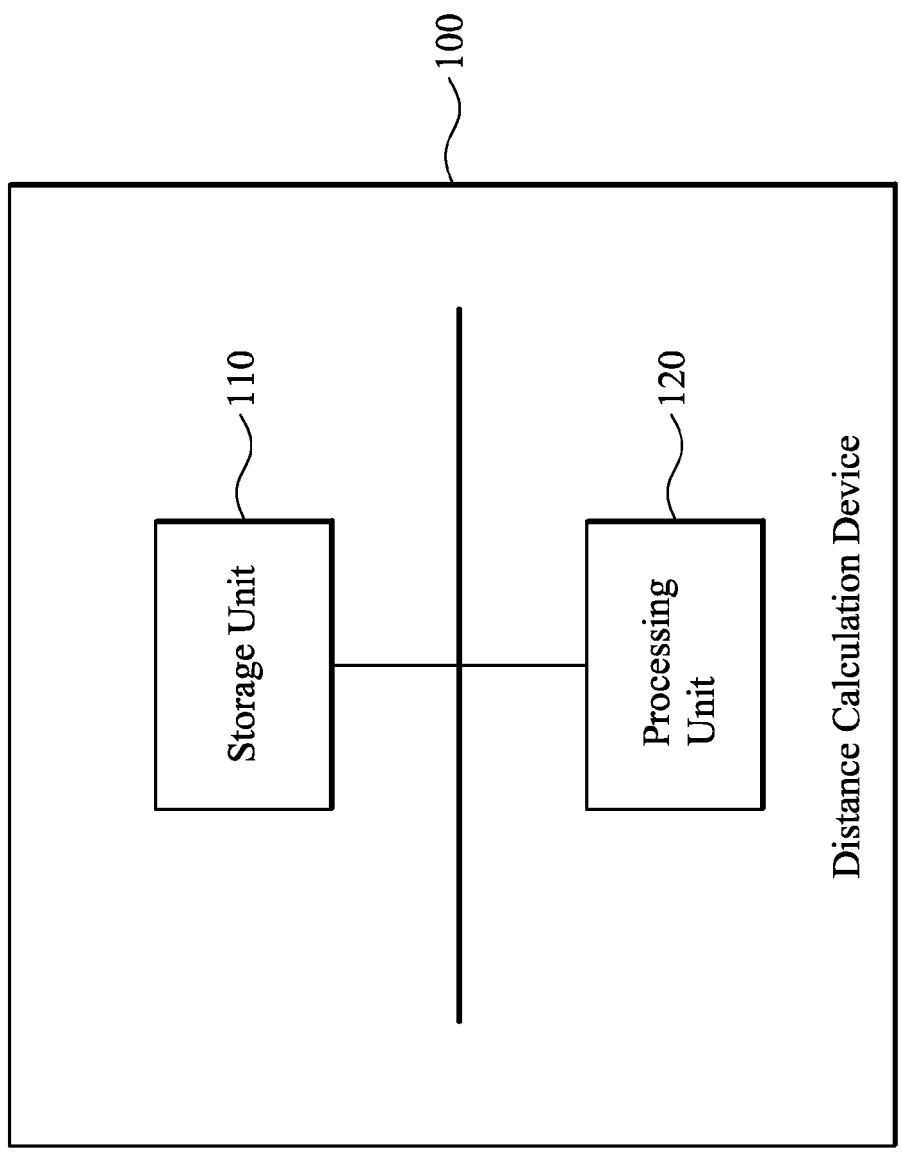
FIG. 1 is a schematic diagram illustrating an embodiment of a distance calculation device of the invention.

FIG. 1 is a schematic diagram illustrating an embodiment of a distance calculation device of the invention. In this embodiment, the distance calculation device 100 may be a processor-based electronic device, such as a computer.

Figure 2:
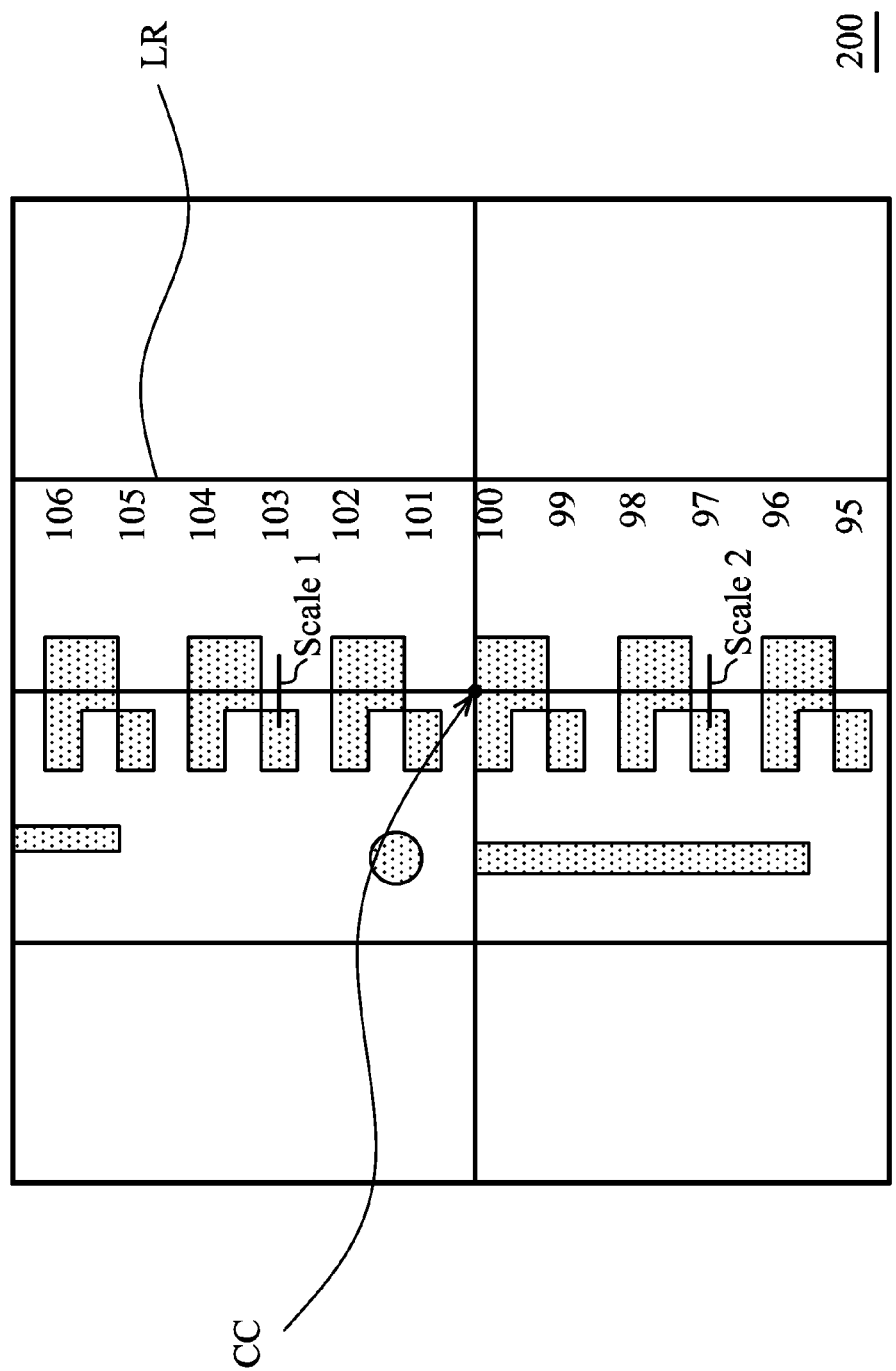
FIG. 2 is a schematic diagram illustrating an embodiment of an image including a level ruler of the invention.

As shown in FIG. 1, the distance calculation device 100 comprises a storage unit 110 and a processing unit 120. The storage unit 110 stores an image corresponding to a level ruler. As shown in FIG. 2, the image 200 comprises a level ruler LR, and a crisscross CC, a scale 1 and a scale 2 projected on the level ruler LR. The coordinate of the crisscross CC is (Cross_CenX, Cross_CenY). The processing unit 120 performs the distance calculation methods of the invention according to the image 200. Related details are discussed later. It is understood that, in some embodiments, the processing unit 120 may be a DSP (Digital Signal Processor), and the storage unit 110 may be a flash memory inside the DSP.

Figure 3:
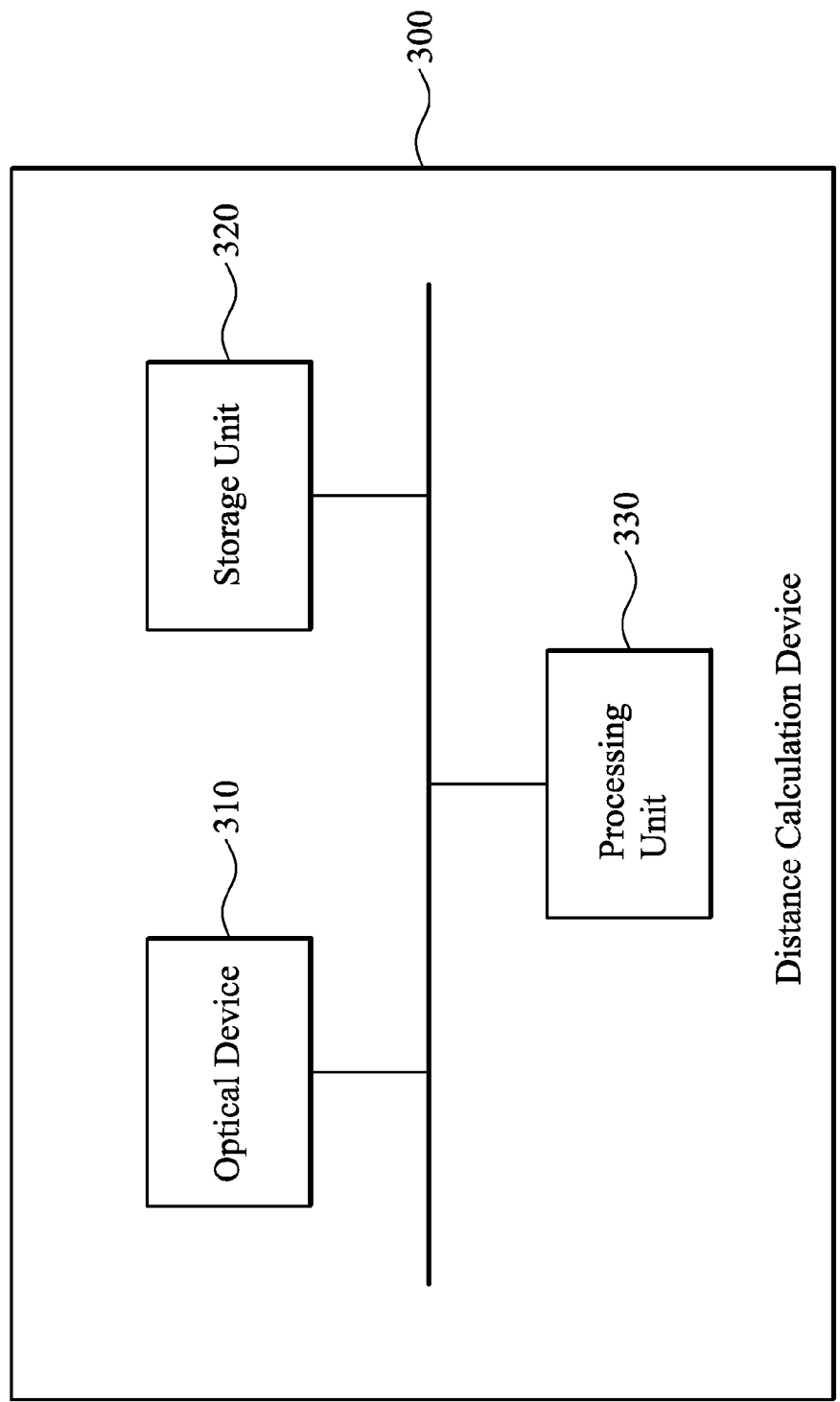
FIG. 3 is a schematic diagram illustrating another embodiment of a distance calculation device of the invention.

FIG. 3 is a schematic diagram illustrating another embodiment of a distance calculation device of the invention. In this embodiment, the distance calculation device 300 may be a level, such as a digital level.

As shown in FIG. 3, the distance calculation device 300 comprises an optical device 310, a storage unit 320 and a processing unit 330. The optical device 310 may comprise an ocular (not shown) and an image sensor (not shown) to capture images. The images captured by the optical device 310 can be stored in the storage unit 320. Similarly, the image 200 captured by the optical device 310 can be as shown in FIG. 2. The processing unit 330 performs the distance calculation methods of the invention according to the image 200. Related details are discussed later. Similarly, in some embodiments, the processing unit 330 may be a DSP, and the storage unit 320 may be a flash memory inside the DSP.

It is noted that, the image recognition devices of embodiments of the invention may have similar components as in the embodiments of FIG. 1 and/or FIG. 3, and related descriptions are omitted for brevity.

Figure 4:
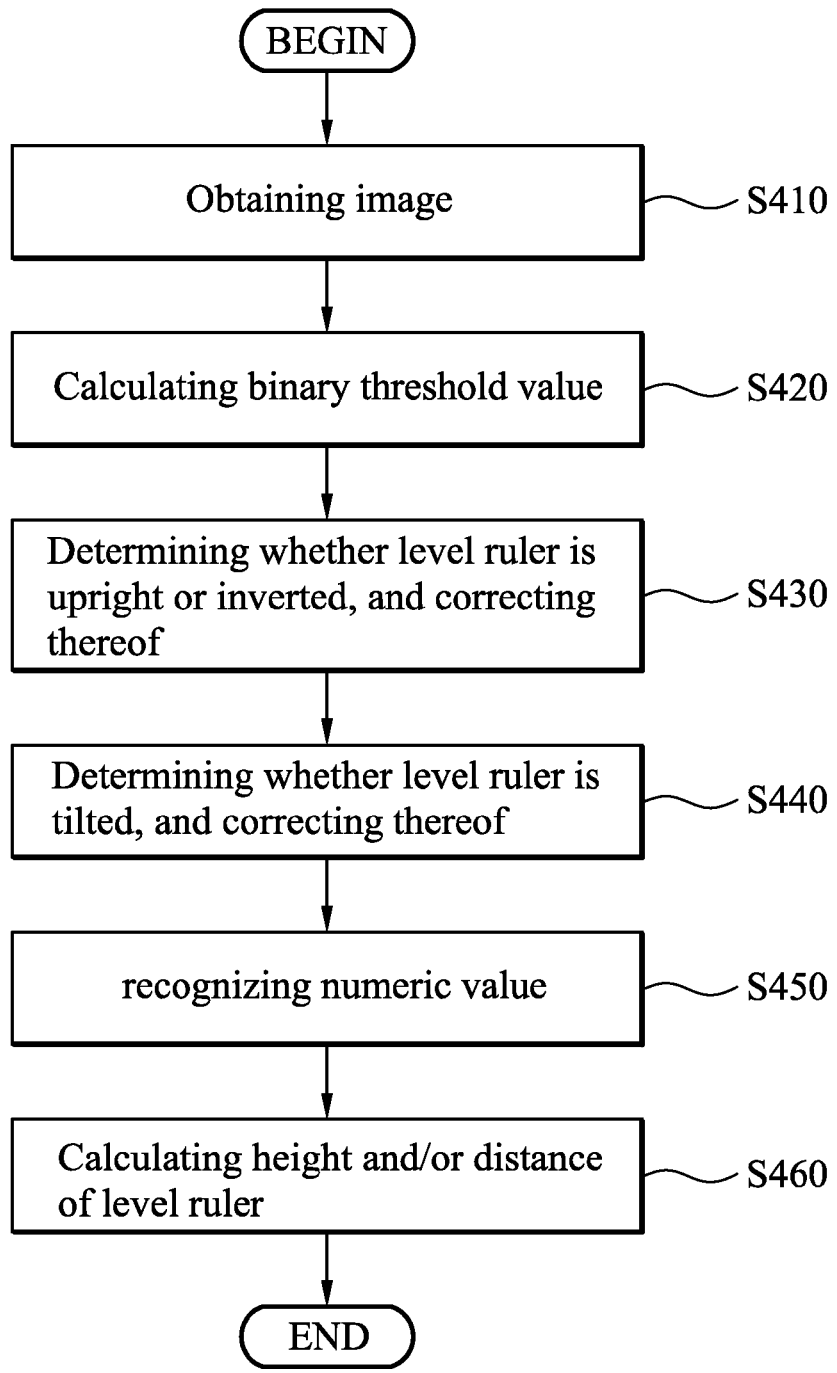
FIG. 4 is a flowchart of an embodiment of a distance calculation method of the invention.

FIG. 4 is a flowchart of an embodiment of a distance calculation method of the invention. It is understood that, the distance calculation method can be performed based on the image recognition methods of the application. The image recognition methods of the application may comprise a method for determining whether a level ruler is upright or inverted, and correcting of the level ruler, a method for determining whether a level ruler is tilted, and correcting of the level ruler, and/or a numeric value recognition method.

In step S410, an image is obtained. As described, the image may comprise a level ruler LR, and a crisscross CC, a scale 1 and a scale 2 projected on the level ruler LR. It is understood that, each pixel in the image may have a brightness value Y and color values UV. In step S420, a binary threshold value is calculated according to the image. The binary threshold value can be used to determine whether a pixel is a part of a scale, a numeric value, and/or a pattern on the level ruler. In step S430, a shape of a scale on the level ruler in the image is recognized, and the determination of whether the level ruler is upright or inverted, and the correction of the level ruler are performed according to the shape of the scale. In step S440, at least one boundary of the scale on the level ruler in the image is recognized, and the determination of whether the level ruler is tilted, and the correction of the level ruler are performed according to the boundary of the scale. Then, in step S450, at least one numeric value on the level ruler is recognized to establish a baseline height of a baseline mark on the level ruler. Thereafter, in step S460, a height and/or a distance of the level ruler are calculated according to the baseline height of the baseline mark, a position of the baseline mark in the image, and positions of the crisscross, the scale 1 and the scale 2 in the image. It is noted that, the calculation of the binary threshold value and related determinations, the determination of whether the level ruler is upright or inverted and corresponding corrections, the determination of whether the level ruler is tilted and corresponding corrections, and/or the calculations of the height and/or distance of the level ruler are discussed later.

Calculation of the Binary Threshold Value

Figure 5:
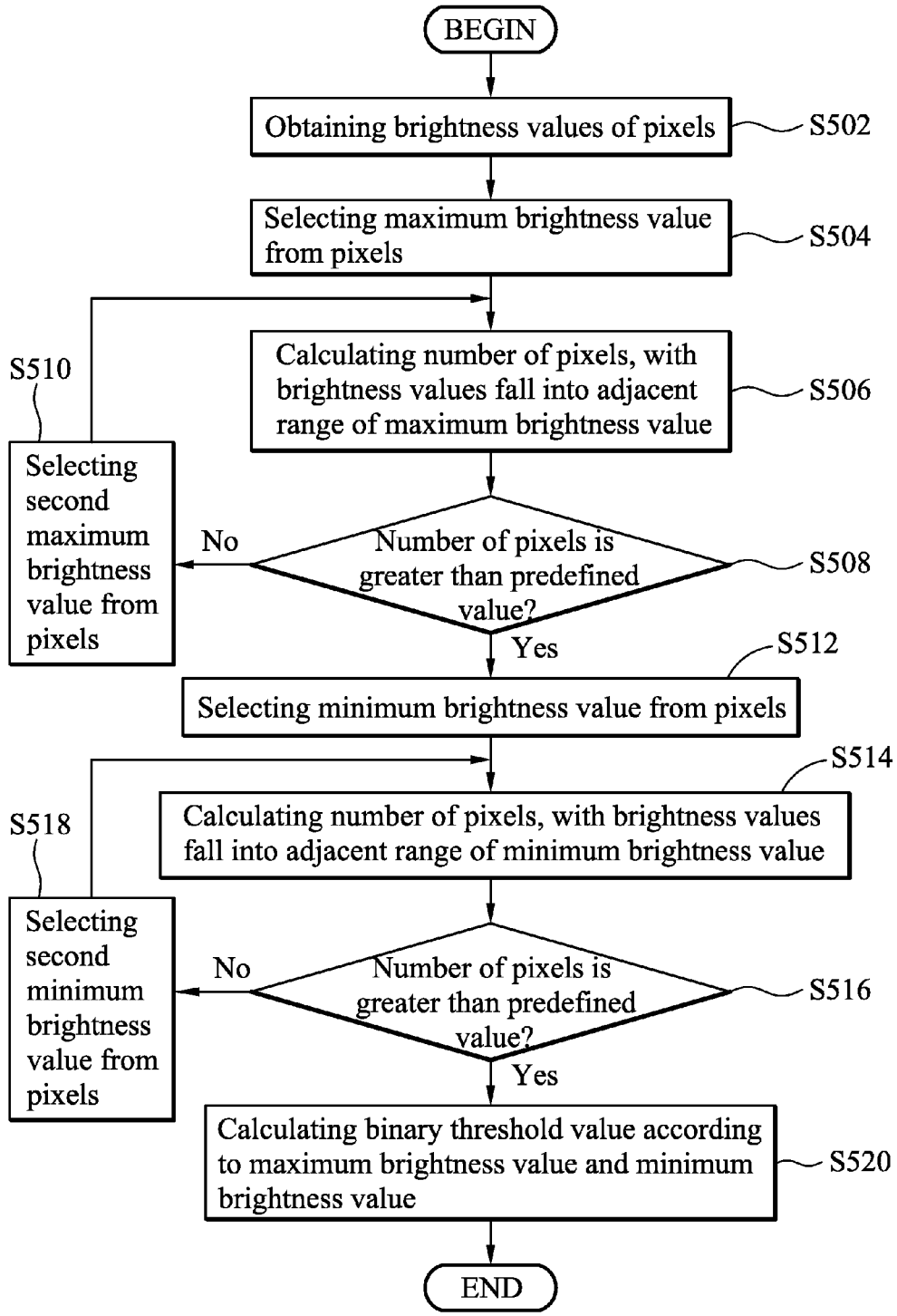
FIG. 5 is a flowchart of an embodiment of a method for calculating a binary threshold value of the invention.

FIG. 5 is a flowchart of an embodiment of a method for calculating a binary threshold value of the invention.

In step S502, the brightness values Y of a predefined number, such as 300 pixels respectively above and below the crisscross CC in the image are obtained. In step S504, a maximum brightness value Ymax is selected from the brightness values Y of the pixels. In step S506, the number of pixels with brightness values Y that fall into an adjacent range, such as [Ymax-20,Ymax] of the maximum brightness value Ymax is calculated. In step S508, it is determined whether the number of pixels calculated in step S506 is greater than a predefined value, such as the total pixel numbers in the image divided by 4. If the number of pixels calculated in step S506 is not greater than the predefined value (No in step S508), in step S510, the second maximum brightness value is selected from the brightness values Y of the pixels, and set as the maximum brightness value Ymax. Then, the procedure returns to step S506. If the number of pixels calculated in step S506 is greater than the predefined value (Yes in step S508), in step S512, a minimum brightness value Ymin is selected from the brightness values Y of the pixels. In step S514, the number of pixels with brightness values Y that fall into an adjacent range, such as [Ymin, Ymin+20] of the minimum brightness value Ymin is calculated. In step S516, it is determined whether the number of pixels calculated in step S514 is greater than a predefined value, such as the total pixel numbers in the image divided by 4. If the number of pixels calculated in step S514 is not greater than the predefined value (No in step S516), in step S518, the second minimum brightness value is selected from the brightness values Y of the pixels, and set as the minimum brightness value Ymin. Then, the procedure returns to step S514. If the number of pixels calculated in step S514 is greater than the predefined value (Yes in step S516), in step S520, a binary threshold value is calculated according to the maximum brightness value Ymax and the minimum brightness value Ymin. In some embodiments, the binary threshold value can be calculated using the following equation:

$$BT=(Ymin+Ymax)/2, \text{ wherein BT is the binary threshold value.}$$

Figure 6:
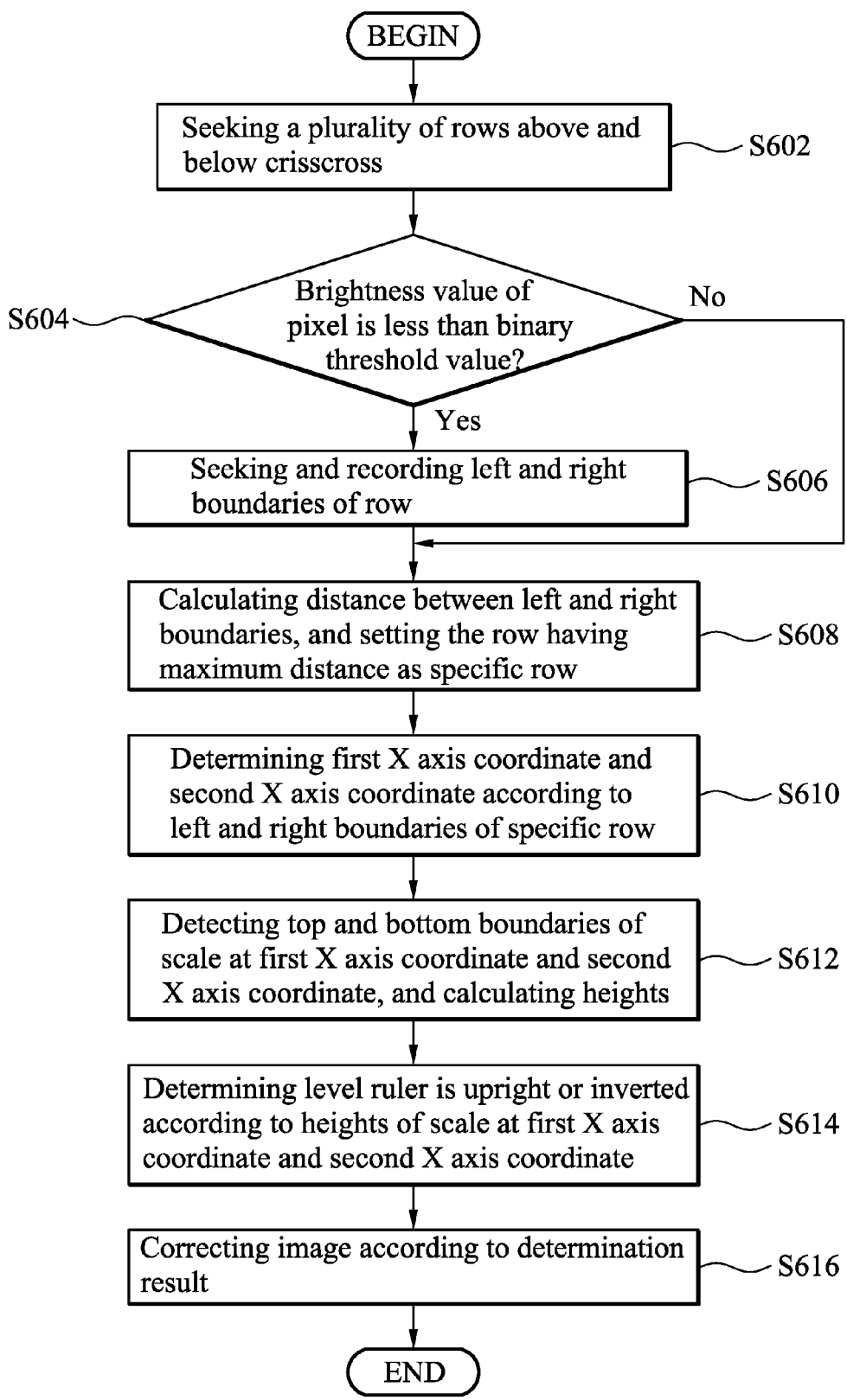
FIG. 6 is a flowchart of an embodiment of a method for determining whether a level ruler is upright or inverted, and correcting of the level ruler of the invention.

Determination of Whether the Level Ruler is Upright or Inverted and Corresponding Corrections FIG. 6 is a flowchart of an embodiment of a method for determining whether a level ruler is upright or inverted, and correcting of the level ruler of the invention.

Figure 7:
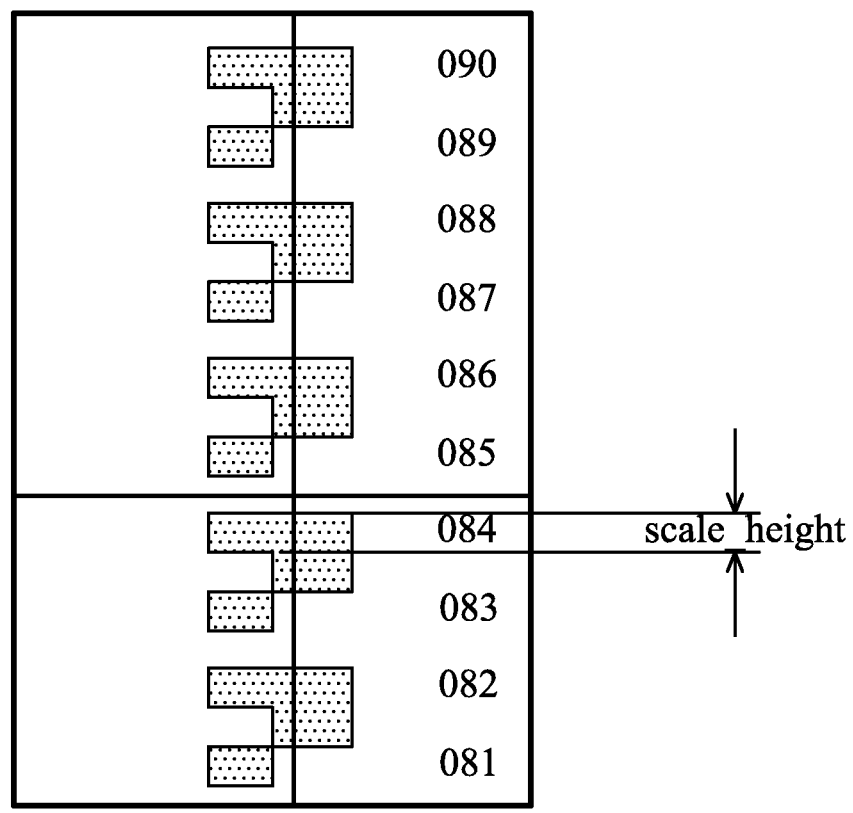
FIG. 7 is a schematic diagram illustrating an embodiment of a scale height on the level ruler of the invention.

In step S602, a plurality of rows respectively above and below the crisscross CC is sought. In some embodiments, two times that of the height of a scale (scale_height) above and below the crisscross CC can be respectively sought, as shown in FIG. 7. In step S604, for each row, it is determined whether the brightness value of a pixel at the Y axis coordinate of the crisscross CC (Cross_CenY) is less than the binary threshold value. If the brightness value of the pixel at the Y axis coordinate of the crisscross CC (Cross_CenY) is not less than the binary threshold value (No in step S604), the procedure goes to step S608. If the brightness value of the pixel at the Y axis coordinate of the crisscross CC (Cross_CenY) is less than the binary threshold value (Yes in step S604), in step S606, the left and right boundaries of the row are sought and recorded. In some embodiments, when pixels are sought from center to left, the brightness value of a specific pixel is less than the binary threshold value, and the brightness values of two successive pixels on the left of the specific pixel are both greater than the binary threshold value, such that the column number of the specific pixel is recorded as the left boundary of the scale at the row. Similarly, when pixels are sought from center to right, the brightness value of a specific pixel is less than the binary threshold value, and the brightness values of two successive pixels on the right of the specific pixel are both greater than the binary threshold value, such that the column number of the specific pixel is recorded as the right boundary of the scale at the row. It is noted that, in some embodiments, the left and right boundaries can be recorded via an array. For example, when scale_height is 50, from row Cross_CenY−2*scale_height to row Cross_CenY+2*scale_height, the left boundaries of the scale at the respective rows are recorded in boundary1[200], and the right boundaries of the scale at the respective rows are recorded in boundary2[200].

Figure 8A:
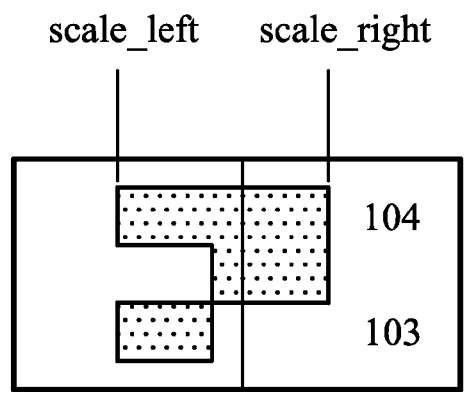
FIGS. 8A and 8B are schematic diagrams respectively illustrating embodiments of left and right boundaries of a scale for an upright level ruler and an inverted level ruler of the invention.
Figure 8B:
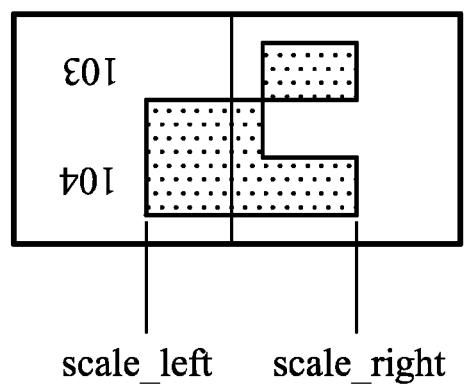

In step S608, the distances between the left and right boundaries at the respective rows are calculated, and a row having the maximum distance is set as a specific row maxI. For example, the values of (boundary2[0]-boundary1[0]), (boundary2[1]-boundary1[1]), . . . , (boundary2[199]-boundary1[199]) are respectively calculated. When the value of (boundary2[i]-boundary1[i]) is a maximum value, the row number is recorded as maxI. Meanwhile, the left boundary of the scale at the row is recorded as scale_left, and the right boundary of the scale at the row is recorded as scale right, as shown in FIGS. 8A and 8B, wherein the level ruler is upright in FIG. 8A, and the level ruler is inverted in FIG. 8B. Then, in step S610, a first X axis coordinate x1 and a second X axis coordinate x2 are determined according to the left boundary scale_left and the right boundary scale_right of the specific row maxI. It is understood that, the first X axis coordinate x1 and the second X axis coordinate x2 are within the range of the left boundary scale_left and the right boundary scale_right. In some embodiments, x1=scale_left+{scale_right−scale_left}/4, and x2=scale_right−(scale_right−scale_left)/4. In step S612, the top and bottom boundaries of the scale at x1 and x2 are respectively detected, and the heights of the scale at x1 and x2 are respectively calculated according to the top and bottom boundaries. Specifically, the top boundary scale_top1 and the bottom boundary scale_bottom1 are respectively sought above and below from maxI at x1, and the height of the scale at x1 is y1, wherein y1=scale_bottom1−scale_top1. Additionally, the top boundary scale_top2 and the bottom boundary scale_bottom2 are respectively sought above and below from maxI at x2, and the height of the scale at x2 is y2, wherein y2=scale_bottom2−scale_top2.

Figure 9A:
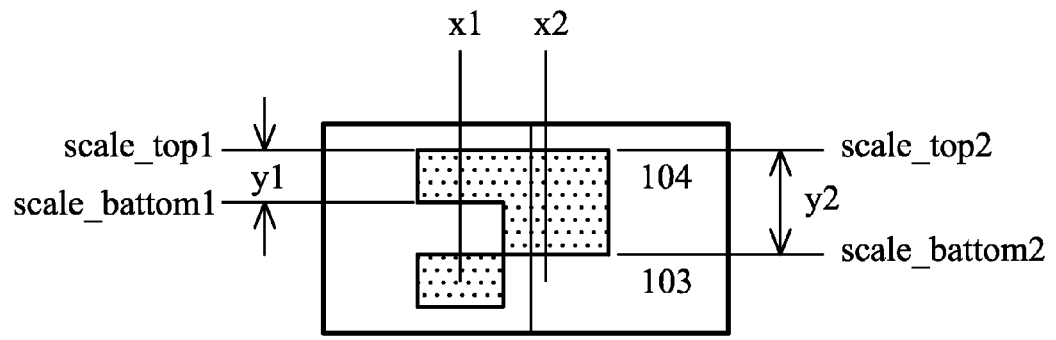
FIGS. 9A and 9B are schematic diagrams respectively illustrating embodiments of top and bottom boundaries and heights of a scale at a first X axis coordinate and a second X axis coordinate for an upright level ruler and an inverted level ruler of the invention.
Figure 9B:
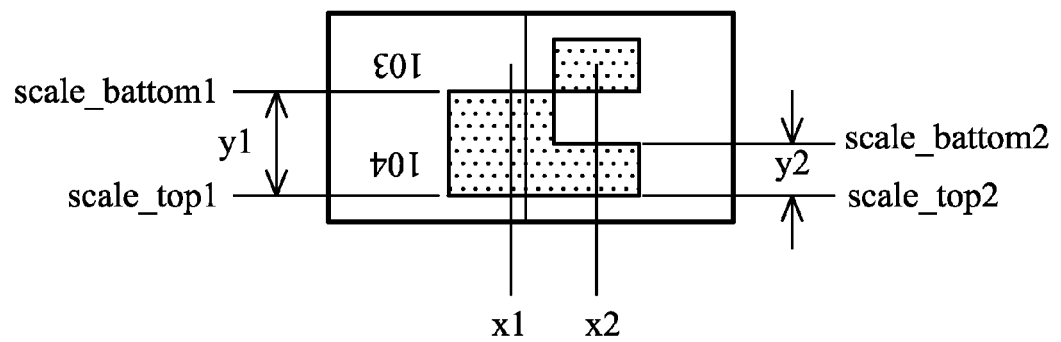

In step S614, it is determined whether the level ruler is upright or inverted according to the heights y1 and y2 of the scale at x1 and x2. FIGS. 9A and 9B are schematic diagrams respectively illustrating embodiments of top and bottom boundaries and heights of a scale at a first X axis coordinate and a second X axis coordinate for an upright level ruler and an inverted level ruler of the invention. As shown in FIGS. 9A and 9B, when the level ruler is upright, the height of the scale y1 at x1 approximately equals to half of the height of the scale y2 at x2. When the level ruler is inverted, the height of the scale y1 at x1 approximately equals to two times that of the height of the scale y2 at x2. Therefore, the heights y1 and y2 of the scale at x1 and x2 can be used to determine whether the level ruler is upright or inverted. In step S616, the image is corrected according to the determination result. For example, when the level ruler is inverted, the image is rotated 180 degrees.

Determination of Whether the Level Ruler is Tilted and Corresponding Corrections As described, when the brightness value of a pixel at the Y axis coordinate Cross_CenY at a row is less than the binary threshold value, the left and right boundaries of the row can be respectively sought and recorded into boundary1[200] and boundary2[200]. The details of seeking the left and right boundaries are omitted herefrom. In determination of whether the level ruler is tilted and corresponding corrections, the indexes of the boundary1[200] and boundary2[200] can be the Y axis coordinates of the respective rows. That is, the X axis coordinates and the Y axis coordinates of the left and right boundaries are recorded. A tilt angle can be calculated using one of the array boundary1[200] and boundary2 [200]. After the tilt angle is calculated, the image can be rotated according to the tilt angle. Additionally, in some embodiments, after the specific row maxI is determined, another specific X axis coordinate x1, for example, x1=scale_right−scale_height/2, can be determined. Then, the top boundary scale_top and the bottom boundary scale_bottom of the scale are respectively sought above and below from the maxI at x1. Thereafter, the right boundaries of respective rows from the top boundary scale_top to the bottom boundary scale_bottom are sought. The right boundaries of respective rows can be used to calculate the tilt angle.

It is understood that, the above descriptions regard the determinations of left and right boundaries of a single scale on the level ruler. However, for more accuracy, a predefined number, such as m scales may be sought above and below the crisscross. The left and right boundaries of all scales can be recorded and used to calculate the tilt angle, and the image is rotated according to the tilt angle. It should be noted that, in some embodiments, when a predefined number, such as 200 data entries is already in the array, the seeking of left and right boundaries for other scales can be omitted, and the calculation of the tilt angle can be directly performed. In some embodiments, the data in one of the arrays boundary1 and boundary2 can be used to perform a linear estimation to calculate a slope using the least squares method.

Numeric Value Recognition

Figure 10:
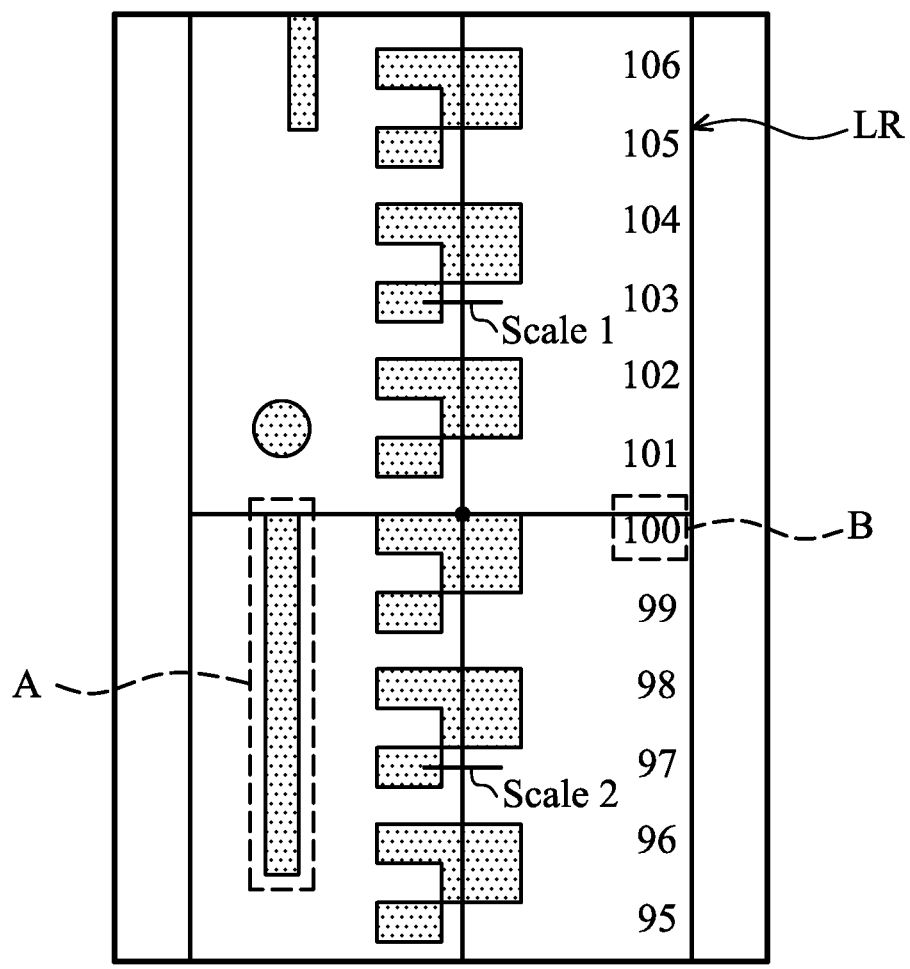
FIG. 10 is a schematic diagram illustrating an embodiment of a level ruler having a large numeric values and a small numeric values of the invention.

FIG. 10 is a schematic diagram illustrating an embodiment of a level ruler having a large numeric value and a small numeric value of the invention. As shown in FIG. 10, when the level ruler LR is far away from the digital level, since the scale_height is small, it is difficult to recognize the small numeric value B. A large numeric value A can be used to determine the baseline height.

Figure 11:
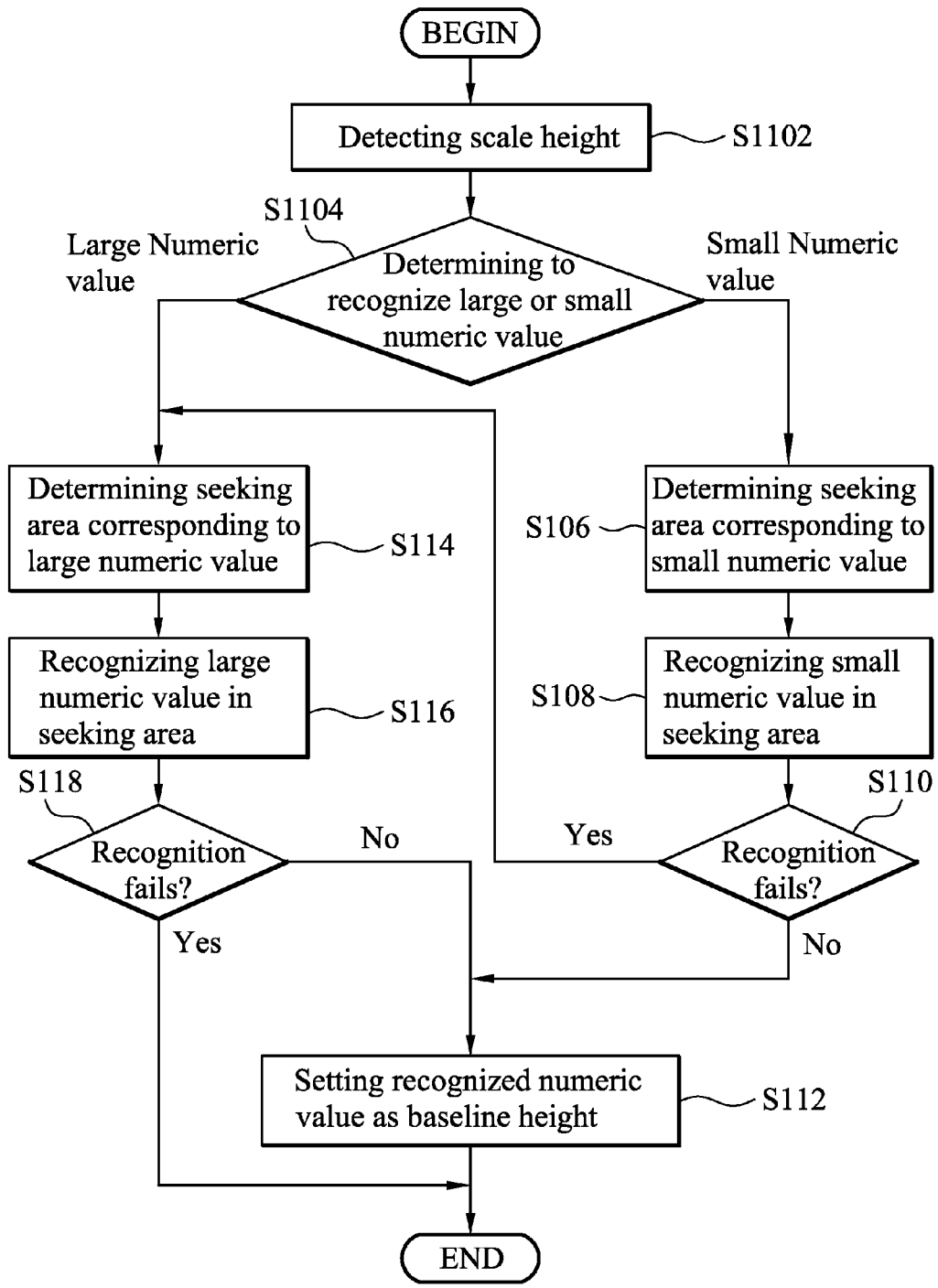
FIG. 11 is a flowchart of an embodiment of a method for recognizing numeric values of the invention.

FIG. 11 is a flowchart of an embodiment of a method for recognizing a numeric value of the invention.

In step S1102, a baseline mark, such as a scale around the crisscross CC in the image is recognized, and a scale height corresponding to the scale is detected. In step S1104, it is determined whether to recognize the large numeric value or the small numeric value on the scale ruler according to the scale height of the scale. If the scale height is less than a predefined value, the large numeric value on the scale ruler is to be recognized. If the scale height is not less than the predefined value, the small numeric value on the scale ruler is to be recognized. When the small numeric value is to be recognized, in step S1106, a seeking area corresponding to the small numeric value is determined according to the position of the scale. Similarly, the left, right, top and bottom boundaries of the scale can be found by comparing the brightness values of respective pixels with the binary threshold value, and the seeking area corresponding to the small numeric value B can be determined according to the boundaries of the scale. Then, in step S1108, at least one numeric value is recognized in the seeking area. It is noted that, the recognized numeric value may be a decimal numeric value. The numeric value recognition method is discussed later. Thereafter, in step S1110, it is determined whether the recognition for the small numeric value has failed or not. If the recognition for the small numeric value has not failed (No in step S1110), in step S1112, the recognized numeric value is set as the baseline height. If the recognition for the small numeric value has failed (Yes in step S1110), the procedure goes to step S1114.

When the large numeric value is to be recognized, in step S1114, a seeking area corresponding to the large numeric value is determined according to the position of the scale. Similarly, the left, right, top and bottom boundaries of the scale can be found by comparing the brightness values of respective pixels with the binary threshold value, and the seeking area corresponding to the large numeric value A can be determined according to the boundaries of the scale. Then, in step S1116, at least one numeric value is recognized in the seeking area. It is noted that, in addition to the numeric value recognition, the number of dots above the recognized numeric value, and whether a character 'm' exists below the recognized numeric value are further determined during the recognition of the large numeric value. Thereafter, in step S1118, it is determined whether the recognition for the large numeric value has failed or not. If the recognition for the large numeric value has not failed (No in step S1118), in step S1112, the baseline height is set according to the recognized numeric value, the number of the dots, and the determination result of whether the character 'm' exists below the recognized numeric value. If the recognition for the large numeric value has failed (Yes in step S1118), the procedure is completed.

In some embodiments, a labeling algorithm can be used to recognize the numeric value. In the labeling algorithm, all connected pixels in the image are marked as a same label, and different groups of connected pixels are marked as different labels. The details of pixel labeling are discussed below. It is understood that the scan sequence of pixels in the image is from top to down, and left to right. When a pixel without a label is scanned, a mask is applied to the pixel to determine a label to be marked. FIG. 12 is a schematic diagram illustrating an embodiment of a mask of the invention. As shown in FIG. 12, the mask 1200 is a 3*3 matrix. The center of the mask 1200 corresponds to the pixel without a label. The usage of the mask is discussed later. An example is presented as follows. An image after the comparison of the binary threshold value is shown as in FIG. 13A, wherein when the brightness value of a pixel is less than the binary threshold value, the pixel is set to 1, and when the brightness value of a pixel is greater than the binary threshold value, the pixel is set to 0. When the first pixel without a label is scanned, the mask 1200 is applied according to the position of the pixel. Since no pixel with a label can be found from the adjacent pixels (adjacent pixel 1, adjacent pixel 2, adjacent pixel 3, and adjacent pixel 4) of the pixel, the pixel is marked as label 2, as shown in FIG. 13B. Then, the scanning is proceeded to find another pixel without a label. Since no pixel with a label can be found from the adjacent pixels (adjacent pixel 1, adjacent pixel 2, adjacent pixel 3, and adjacent pixel 4) of the pixel, the pixel is marked as label 3, as shown in FIG. 13C. Then, the scanning is proceeded to find another pixel without a label. Since the adjacent pixel 1 has no label, and the adjacent pixel 2 has been marked with label 2, the pixel is marked as label 2. Additionally, since the adjacent pixels 3 and 4 have no label, label 2 for the pixel is kept, as shown in FIG. 13D. Then, the scanning is proceeded to find another pixel without a label. Since the adjacent pixel 1 has been marked with label 3, the pixel is marked as label 3. The adjacent pixel 2 has no label, and the adjacent pixel 3 has been marked with label 2. The pixel should be marked as label 2. However, since the pixel has been marked with label 3, all pixels having label 2 are remarked as label 3, such that all connected pixels have the same label, as shown in FIG. 13E. Then, the scanning is proceeded to find another pixel without a label. Since no pixel with a label can be found from the adjacent pixels (adjacent pixel 1, adjacent pixel 2, adjacent pixel 3, and adjacent pixel 4) of the pixel, the pixel is marked as label 4, as shown in FIG. 13F. The process for pixel labeling continues until all pixels in the image have been scanned. When all connected pixels are labeled, the pixels which should be connected can be determined according to the length, width and height of the labeled pixels, as '5' shown in FIG. 13G.

Figure 14A:
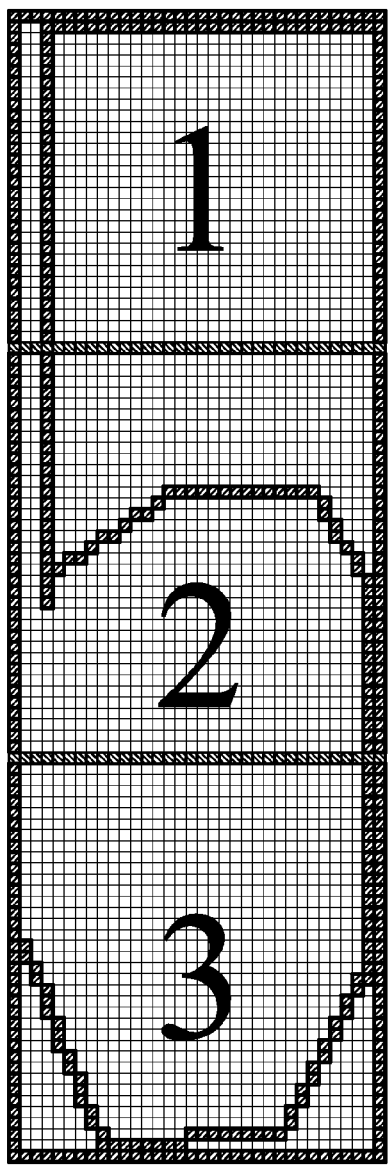
FIGS. 14A and 14B are schematic diagrams illustrating embodiments of label distribution areas of the invention.
Figure 14B:
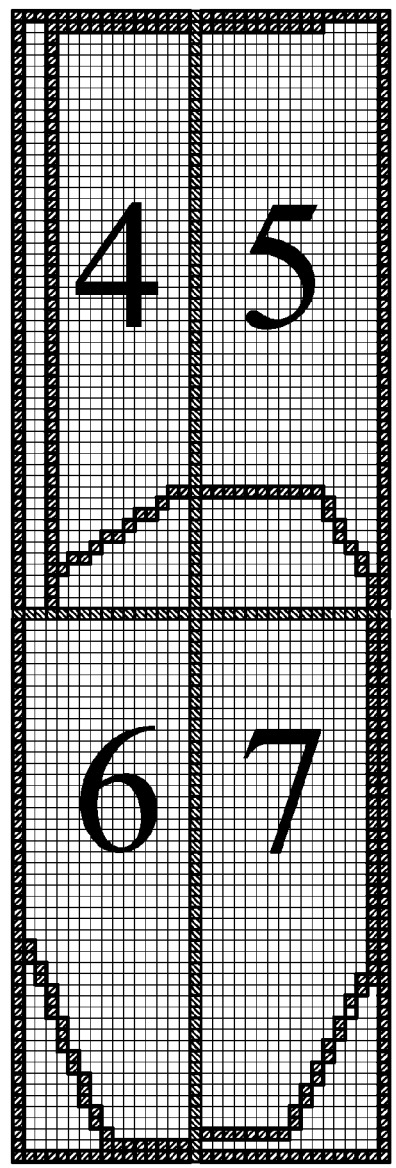

After the pixels which should be connected are determined, the pixels with labels are thinned to obtain a thinned pattern, as shown in FIG. 13H. Then, a numeric value can be recognized according to the distribution of the labels. In some embodiments, when the numeric value is '1', since the width of '1' is small, it can be directly recognized. For other numeric values, the distribution of the labels can be divided into a plurality of regions, and different numeric values can be corresponded according to the distribution of the labels in the regions. For example, the connected labels are divided into three regions 1~3, as shown in FIG. 14A. Then, the connected labels are further divided into four regions 4~7, as shown in FIG. 14B. Regions 1~7 correspond to a binary code. The total number of rows M in each region is first calculated. Then, the number of rows N which comprise black pixels (pixel value is 1 after the comparison of the binary threshold value) is next calculated. When N>M/2 in a region, the code for the region is '1'. After all regions are performed the above calculation and determinations are made, a binary code for the connected labels is obtained. Then, the binary code can be compared with the predefined binary codes for the numeric value 0~9 to recognize the numeric value corresponding to the connected labels. In this embodiment, the binary code for numeric value '0' is '1011111', the binary code for numeric value '2' is '1110110', the binary code for numeric value '3' is '1110101', the binary code for numeric value '4' is '0101101', the binary code for numeric value '5' is '1111001', the binary code for numeric value '6' is '1111011', the binary code for numeric value '7' is '10000101' or '1001101', the binary code for numeric value '8' is '1111111', and the binary code for numeric value '9' is '1111101' or '1101101'. Therefore, the baseline height m_height can be obtained according to the recognized numeric value, and the pixel position of the baseline mark (m_height_i) in the image can be recorded.

Calculations of the Height and Distance

The height where the crisscross CC is located, and the height difference between the scale 1 and the scale 2 can be calculated according to the baseline height m_height of the baseline mark, the pixel position of the baseline mark (m_height_i) in the image, and the pixel position of the crisscross CC (Cross_CenX, Cross_CenY).

Figure 15:
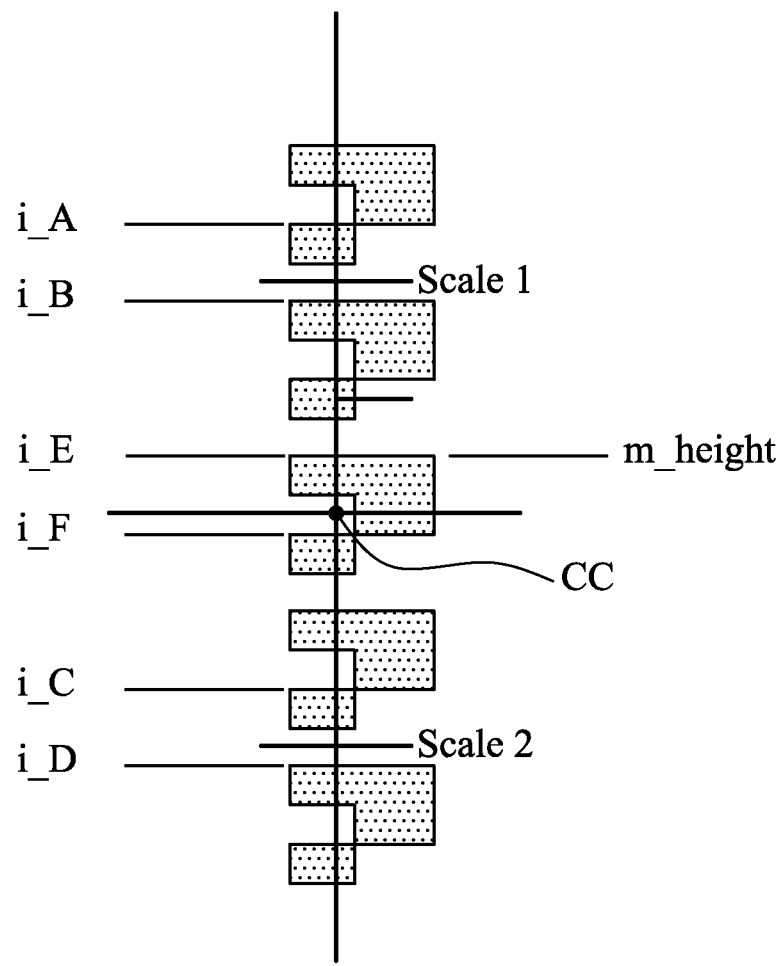
FIG. 15 is a schematic diagram illustrating an embodiment of height and distance calculations of the invention.

FIG. 15 shows an embodiment of height and distance calculations of the invention.

First, from the position of the baseline mark in the image (m_height_i), the coordinates of the top boundary i_A and bottom boundary i_B of a scale on the level ruler are sought, wherein the scale 1 corresponds to the scale (the Y axis coordinate of the scale 1 is Cross_Y1). During the seeking process, the number of scales (N_scale1=3) from m_height_i to i_A is simultaneously recorded. The height where the scale 1 is located can be calculated as follows: H_up=m_height+N_scale1−(i_A−Cross_Y1)/(i_A−i_B), wherein H-up is the height of the scale 1. Similarly, from the position of the baseline mark in the image (m_height_i), the coordinates of the top boundary i_C and bottom boundary i_D of a scale on the level ruler are sought, wherein the scale 2 corresponds to the scale (the Y axis coordinate of the scale 2 is Cross_Y2). During the seeking process, the number of scales (N_scale2=4) from m_height_i to i_D is simultaneously recorded. The height where the scale 2 is located can be calculated as follows: H_down=m_height−N_scale2+(Cross_Y2−i_D)/(i_C−i_D), wherein H-down is the height of the scale 2. Similarly, from the position of the baseline mark in the image (m_height_i), the coordinates of the top boundary i_E and bottom boundary i_F of a scale on the level ruler are sought, wherein the crisscross CC corresponds to the scale. During the seeking process, the number of scales (N_scale0=1) from m_height_i to i_F is simultaneously recorded. The height where the crisscross CC located can be calculated as follows: H_cross=m_height−N_scale0+(Cross_CenY−i_F)/(i_E−i_F), wherein H-cross is the height of the crisscross CC. The height difference between the scale 1 and the scale 2 is calculated as follows: H_distance=H_up−H_down, wherein H_distance is the height difference between the scale 1 and the scale 2. The distance of the level ruler to a measurement instrument, such as the digital level, equals to the height difference between the scale 1 and the scale 2 multiplied by an optical coefficient β, wherein the ratio of the distance between the ocular and the image sensor to the distance between the scale 1 and the scale 2 is the optical coefficient β. Since the ratio of the image distance to the image height equals to the ratio of the subject distance to the subject height, the subject distance equals to the ratio of the image distance to the image height multiplied by the subject height, wherein the image distance is the distance between the ocular and the image sensor, the image height is the distance between the scale 1 and the scale 2, the subject height is H_distance, and the subject distance is the distance between the digital level and the level ruler. Therefore, the distance between the digital level and the level ruler equals to the ratio of the distance between the ocular and the image sensor to the distance between the scale 1 and the scale 2, multiplied by H_distance. When the ratio of the distance between the ocular and the image sensor to the distance between the scale 1 and the scale 2 equals the optical coefficient β, the distance between the digital level and the level ruler can be calculated as follows: Distance=β*H_distance, wherein the 'Distance' is the distance between the digital level and the level ruler.

As described, the distance calculation method can be performed based on the image recognition methods of the application. The image recognition methods of the application may comprise the method for determining whether a level ruler is upright or inverted, and correcting of the level ruler, the method for determining whether a level ruler is tilted, and correcting of the level ruler, and/or the numeric value recognition method. It is noted that, the above embodiments focus on the recognition of the height of a scale using an image. However, the image recognition methods of the application are not limited to only recognizing the height, any meaningful terms, such as length which can be represented by numeric values can be also recognized in the application.

The image recognition and distance calculation methods and devices can perform related image recognitions, such as the determination of whether a level ruler is upright or inverted, and corresponding correction, the determination of whether a level ruler is tilted, and corresponding correction, the numeric value recognition, and/or the determinations of heights of predefined scales, and distance between a device to a level ruler, thus reducing erroneous determinations due to manual reading.

Image recognition and distance calculation methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An image recognition method, comprising:
    obtaining an image corresponding to a level ruler, wherein the image comprises at least one predefined scale projected on the level ruler;
    determining a baseline height of a baseline mark in the level ruler according to the image;
    seeking positions of a top boundary and a bottom boundary of a first scale in the image from a position of the baseline mark in the image as a beginning position, wherein the predefined scale corresponds to a second scale on the level ruler;
    recognizing a height of the predefined scale according to a position of the predefined scale in the image, the positions of the top boundary and the bottom boundary of the first scale in the image, the baseline height of the baseline mark, and a number of numeric values between the beginning position and the top boundary of the first scale in the image;
    seeking a plurality of pixel rows proximate said baseline mark;
    selecting from said plurality of pixel rows the pixel row having the greatest distance between left and right scale boundaries in said pixel row;
    determining whether the level ruler is upright or inverted based on the heights of the left and right scale boundaries intersecting said selected pixel row; and
    when the level ruler is inverted, rotating the image by 180 degrees.

2. The method of claim 1, wherein the step of determining the baseline height of the baseline mark in the level ruler according to the image comprises the steps of:
    determining a seeking area around the baseline mark;
    recognizing at least one numeric value within the seeking area; and
    setting the numeric value as the baseline height of the baseline mark.

3. The method of claim 2, wherein the step of determining the baseline height of the baseline mark in the level ruler according to the image further comprises the steps of:
    recognizing the second scale around the baseline mark from the image;
    recognizing a scale height of the second scale; and
    determining the seeking area according to the scale height of the second scale.

4. The method of claim 2, wherein the step of recognizing the numeric value within the seeking area comprises the steps of:
    determining whether a pixel within the seeking area has at least one adjacent pixel having a same pixel character of the pixel, wherein the pixel character represents that a brightness value of the pixel is less than a threshold value;
    when the pixel has an adjacent pixel having the same pixel character of the pixel, marking the pixel and the adjacent pixel with a specific label; and
    determining the numeric value according to a distribution of the specific label.

5. The method of claim 4, wherein the step of recognizing the numeric value within the seeking area further comprises the steps of:
    dividing the distribution of the specific label into a plurality of regions;
    calculating the number of rows comprising the specific label in the respective region; and
    determining the numeric value according to the number of rows comprising the specific label in the respective region.

6. The method of claim 4, wherein the method for determining the threshold value comprises the steps of:
    determining a first maximum brightness value and a first minimum brightness value according to the brightness values of a plurality of pixels; and
    determining the threshold value according to the first maximum brightness value and the first minimum brightness value.

7. The method of claim 6, wherein the method for determining the threshold value further comprises the steps of:
    determining whether the number of the pixels with brightness values within a first adjacent range of the first maximum brightness value is greater than a predefined value, and determining whether the number of the pixels with brightness values within a second adjacent range of the first minimum brightness value is greater than the predefined value;
    when the number of the pixels with brightness values within the first adjacent range of the first maximum brightness value is not greater than the predefined value, re-determining a second maximum brightness value according to the brightness values of the pixels;
    when the number of the pixels with brightness values within the second adjacent range of the first minimum brightness value is not greater than the predefined value, re-determining a second minimum brightness value according to the brightness values of the pixels; and
    determining the threshold value according to the second maximum brightness value and the second minimum brightness value.

8. The method of claim 1, further comprising:
    seeking a left boundary or a right boundary of the second scale;
    calculating a tilt angle according to a Y axis coordinate and a X axis coordinate of the left boundary or the right boundary; and
    rotating the image according to the tilt angle.

9. The method of claim 1, wherein the level ruler is upright or inverted according to the heights of both sides of the second scale.

10. An image recognition method, comprising:
    obtaining an image corresponding to a level ruler, wherein the image comprises at least one predefined scale projected on the level ruler;
    determining a baseline height of a baseline mark in the level ruler according to the image;
    seeking positions of a top boundary and a bottom boundary of a first scale in the image from a position of the baseline mark in the image as a beginning position, wherein the predefined scale corresponds to the- a second scale on the level ruler;

recognizing a height of the predefined scale according to a position of the predefined scale in the image, the positions of the top boundary and the bottom boundary of the first scale in the image, the baseline height of the baseline mark, and a number of the second scales between the beginning position and the top boundary of the first scale in the image;

recognizing a shape of the second scale on the level ruler in the image, and determining whether the level ruler is upright or inverted according to the shape of the second scale; and when the level ruler is inverted, rotating the image by 180 degrees;

wherein the step of recognizing the shape of the second scale on the level ruler in the image, and determining whether the level ruler is upright or inverted according to the shape of the second scale comprises the steps of:

determining a first X axis coordinate and a second X axis coordinate; respectively detecting heights of the second scale at the first X axis coordinate and the second X axis coordinate; and determining whether the level ruler is upright or inverted according to the heights of the second scale at the first X axis coordinate and the second X axis coordinate.

11. The method of claim 10, wherein the step of recognizing the shape of the second scale on the level ruler in the image, and determining whether the level ruler is upright or inverted according to the shape of the second scale further comprises the steps of:

determining a specific Y axis coordinate;

seeking a left boundary and a right boundary of the second scale at the specific Y axis coordinate; and determining the first X axis coordinate and the second X axis coordinate according to the left boundary and the right boundary, wherein the first X axis coordinate and the second X axis coordinate are within the left boundary and the right boundary.

12. The method of claim 11, wherein the step of recognizing the shape of the second scale on the level ruler in the image, and determining whether the level ruler is upright or inverted according to the shape of the second scale further comprises the steps of:

seeking a plurality of rows above or below a crisscross projected on the level ruler in the image, wherein the crisscross has a crisscross X axis coordinate and a crisscross Y axis coordinate;

determining whether a brightness value of a pixel in each row at the crisscross X axis coordinate is less than a threshold value;

when the brightness value of the pixel in each row at the crisscross X axis coordinate is less than the threshold value, seeking a left boundary and a right boundary of the second scale in the row;

calculating the distance between the left boundary and the right boundary for the respective row to find a maximum distance therebetween; and setting a Y axis coordinate of the row having the maximum distance as the specific Y axis coordinate.

13. A distance calculation method, comprising:

obtaining an image corresponding to a level ruler, wherein the image comprises a first predefined scale and a second predefined scale projected on the level ruler;

determining a baseline height of a baseline mark in the level ruler according to the image;

calculating a height of the first predefined scale according to the baseline height of the baseline mark, a position of the baseline mark in the image, and a position of the first predefined scale in the image;

calculating a height of the second predefined scale according to the baseline height of the baseline mark, a position of the baseline mark in the image, and a position of the second predefined scale in the image;

calculating a distance to the level ruler according to a height difference between the heights of the first predefined scale and the second predefined scale;

seeking a plurality of pixel rows proximate said baseline mark;

selecting from said plurality of pixel rows the pixel row having the greatest distance between left and right scale boundaries in said pixel row;

determining whether the level ruler is upright or inverted based on the heights of the left and right scale boundaries intersecting said selected pixel row; and when the level ruler is inverted, rotating the image by 180 degrees.

14. The method of claim 13, wherein the step of calculating the height of the first predefined scale according to the baseline height of the baseline mark, the position of the baseline mark in the image, and the position of the first predefined scale in the image comprises the steps of:

seeking positions of a top boundary and a bottom boundary of a first scale in the image from a position of the baseline mark in the image as a beginning position, wherein the first predefined scale corresponds to the second scale on the level ruler; and calculating the height of the first predefined scale according to the position of the first predefined scale in the image, the positions of the top boundary and the bottom boundary in the image, the baseline height of the baseline mark, and a number of numeric values between the beginning position and the top boundary of the first scale in the image.

15. The method of claim 13, wherein the step of calculating the height of the second predefined scale according to the baseline height of the baseline mark, the position of the baseline mark in the image, and the position of the second predefined scale in the image comprises the steps of:

seeking positions of a top boundary and a bottom boundary of a first scale in the image from a position of the baseline mark in the image as a beginning position, wherein the second predefined scale corresponds to the second scale on the level ruler; and calculating the height of the second predefined scale according to the position of the second predefined scale in the image, the positions of the top boundary and the bottom boundary in the image, the baseline height of the baseline mark, and a number of numeric values between the beginning position and the top boundary of the first scale in the image.

16. The method of claim 13, wherein the image further comprises a crisscross projected on the level ruler, and the method further comprises a step of calculating a height of the crisscross according to the baseline height of the baseline mark, the position of the baseline mark in the image, and a position of the crisscross in the image.

17. The method of claim 16, wherein the step of calculating the height of the crisscross according to the baseline height of the baseline mark, the position of the baseline mark in the image, and the position of the crisscross in the image comprises the steps of:

seeking positions of a top boundary and a bottom boundary of a first scale in the image from a position of the baseline mark in the image as a beginning position, wherein the crisscross corresponds to the second scale on the level ruler; and calculating the height of the crisscross according to the position of the crisscross in the image, the positions of the top boundary and the bottom boundary in the image, the baseline height of the baseline mark, and a number of numeric values between the beginning position and the top boundary or the bottom boundary.

18. The method of claim 13, wherein the step of determining the baseline height of the baseline mark in the level ruler according to the image comprises the steps of:

determining a seeking area around the baseline mark;

recognizing at least one numeric value within the seeking area; and setting the numeric value as the baseline height of the baseline mark.

19. The method of claim 18, wherein the step of determining the baseline height of the baseline mark in the level ruler according to the image further comprises the steps of:

recognizing the second scale around the baseline mark from the image;

recognizing a scale height of the second scale; and determining the seeking area according to the scale height of the second scale.

20. The method of claim 13, wherein the step of calculating the distance to the level ruler according to the height difference between the heights of the first predefined scale and the second predefined scale is performed by multiplying the height difference by an optical coefficient, wherein the optical coefficient is determined by a distance between an ocular and an image sensor, and a distance between the first predefined scale and the second predefined scale.

21. The method of claim 13, wherein the level ruler is upright or inverted according to the heights of both sides of the second scale.

* * * * *